United States Patent [19]

Shepard

[11] Patent Number: 4,872,420
[45] Date of Patent: Oct. 10, 1989

[54] DISPOSABLE CAT LITTER SYSTEM

[76] Inventor: Daniel R. Shepard, 400 E. 77th St., Apt. 14 J, New York, N.Y. 10021

[21] Appl. No.: 226,613

[22] Filed: Aug. 1, 1988

[51] Int. Cl.$^4$ .............................................. A01K 29/00
[52] U.S. Cl. ......................................... 119/1; 220/403
[58] Field of Search .................... 119/1; 220/403, 404, 220/405

[56] References Cited

U.S. PATENT DOCUMENTS

| | | | |
|---|---|---|---|
| 4,156,400 | 5/1979 | Migdal | 119/1 |
| 4,640,225 | 2/1987 | Yananton | 119/1 |
| 4,646,684 | 3/1987 | Embrt | 119/1 |
| 4,646,685 | 3/1987 | Arenz | 119/1 |
| 4,763,603 | 8/1988 | Coes | 119/1 |
| 4,779,566 | 10/1988 | Morris et al. | 119/1 |
| 4,779,567 | 10/1988 | Smith | 119/1 |
| 4,788,935 | 12/1988 | Bella et al. | 119/1 |
| 4,807,563 | 2/1989 | Berry et al. | 119/1 |

Primary Examiner—Richard J. Apley
Assistant Examiner—Robert W. Bahr
Attorney, Agent, or Firm—Cooper & Dunham

[57] ABSTRACT

A disposable cat litter box is disclosed comprising a liner pan for receiving cat litter, with the liner pan having an open top, bottom and sides and cat litter disposed in the liner pan. A disposal bag having an opening at least equal to the bottom of the liner pan and a drawstring around the opening is attached to the bottom of the exterior of the liner pan with the opening of the disposal bag around the sides of the liner pan. A covering lid is secured to the top of the liner pan to hold the cat litter inside the liner pan with a tear cord for removing the lid from the liner pan to expose the cat litter during use. After use, pulling on the drawstring causes the opening of the bag to cover the open top and fully enclose the liner pan and any used cat litter therein. Other embodiments are also disclosed.

3 Claims, 4 Drawing Sheets

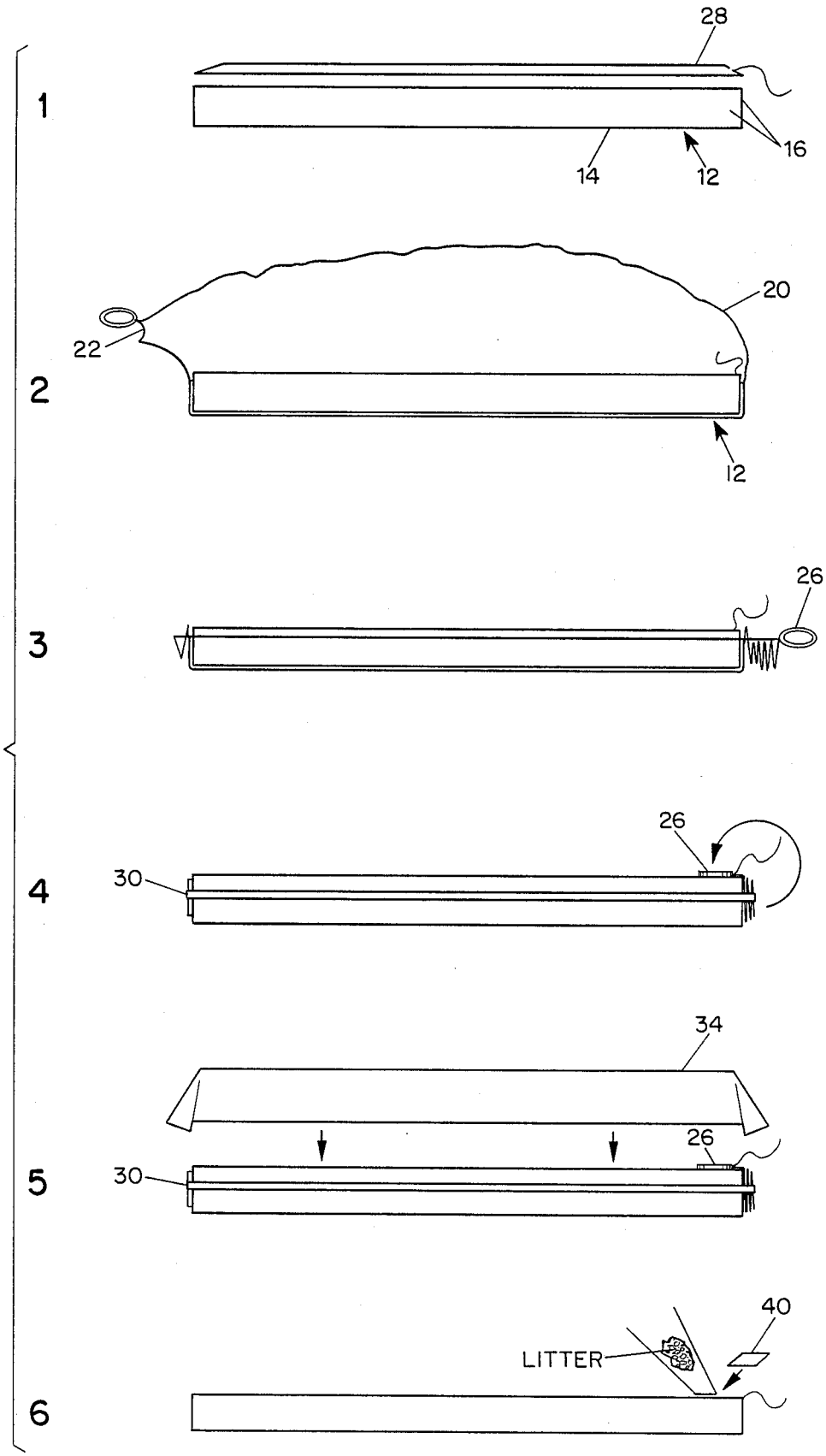

TOP VIEW—TEAR CORD COVER

CROSS-SECTIONAL VIEW

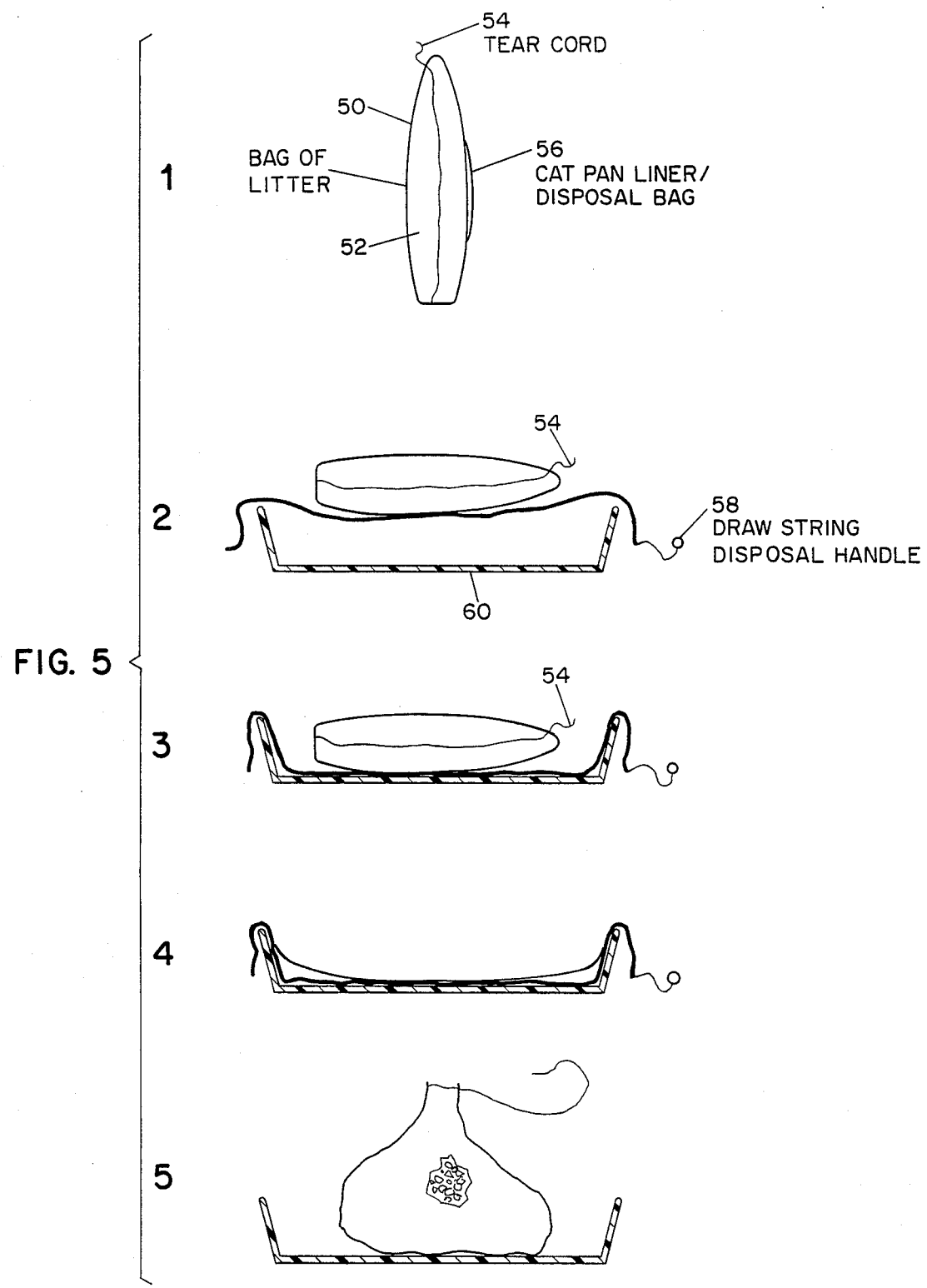

DISPOSABLE CAT LITTER SYSTEM

BACKGROUND OF THE INVENTION

The present invention relates to a disposable cat litter system which can be provided either with cat litter or without cat litter.

The handling of cat litter is a concern to millions of cat owners. The cleaning and filling of a cat box, and the handling of cat waste and litter are considered to be the biggest drawbacks to owning a cat. Further, a parasite sometimes found in cat droppings can cause toxoplasmosis, a harmful condition which is particularly dangerous to pregnant women. Further, some research reportedly has shown that the use of a litter box for one's cat can extend the cat's life by several years and make contracting fleas, ticks and certain diseases less likely.

SUMMARY OF THE INVENTION

It is an object of the present invention to provide a cat litter system which results in easier, safer and less unpleasant handling of cat litter.

It is also an object of the present invention to provide a cat litter system which is disposable when it is filled.

It is further an object of the present invention to provide a cat litter system which can be provided either with or without cat litter at the distribution stage, the former for providing an already complete system for cat litter, and the latter for allowing cat owners to use a cat litter of their choice in the cat litter system according to the invention.

It is another object of the present invention to provide a cat litter system which will virtually eliminate a cat owner's handling of any of the cat litter after it is used. By providing a cat litter system in accordance with the present invention, a cat owner is much more likely to supply fresh cat litter on a more frequent basis for the cat, thereby reducing the amount of unpleasant odors, and growth of bacteria, disease, fleas and ticks posing a problem to both the cat and the cat owner.

In accordance with the present invention a disposable cat litter system is provided comprising a liner pan for receiving cat litter, said liner pan having an open top, a bottom and sides. The cat litter system also comprises a disposal bag having an opening at least equal to the bottom of the liner pan, the disposal bag being attached to at least the bottom of the exterior of the liner pan with the opening of the disposal bag around the sides of the liner pan. In this arrangement, pulling on the opening of the bag to cover the open top of and fully enclose the liner pan and any used cat litter therein. According to this form of the invention, the cat litter box may or may not be provided with cat litter, and in the latter case the cat owner can use any cat litter of his choosing in the cat litter system.

According to another form of the invention, a disposable cat litter box is provided comprising a liner pan for receiving cat litter, said liner pan having an open top, a bottom and sides. The liner pan is provided with cat litter disposed therein. A disposal bag is also provided having an opening at least equal to the bottom of the liner pan and a draw string means around the opening, with the disposal bag being attached to at least the bottom of the exterior of the liner pan with the opening of the disposal bag around the sides of the liner pan. A covering lid is secured to the top of the liner pan to hold the cat litter inside the liner pan, with the covering lid having means for removing the lid from the liner pan to expose the cat litter during use. In this arrangement, pulling on the draw string means causes the opening of the bag to cover the opened top of and fully enclose the liner pan and any used cat litter therein.

According to another embodiment of the invention, a disposable cat litter system is provided comprising a litter bag containing cat litter and having at least one generally flat side, and a disposal bag attached to said litter bag side, said disposal bag having an opening large enough to encircle the litter bag whereby said litter bag can be placed in a cat litter pan with the one bag side downward and with the disposal bag opening arranged around the edges of the pan, and whereby the litter bag may be opened to exposed said cat litter for use by a cat and after use the disposal bag can be used to fully enclose the litter bag and used cat litter for easy disposal thereof.

Other objects and advantages in accordance with the invention will become apparent from the following detailed description, appended claims and accompanying drawings.

BRIEF DESCRIPTION OF THE DRAWINGS

FIG. 3 is an elevational view showing the various steps in making the embodiment of the cat litter system shown in FIG. 1;

FIG. 5 is an alternative embodiment of a cat litter system in accordance with the invention.

DETAILED DESCRIPTION OF THE PREFERRED EMBODIMENTS

Figure 1:
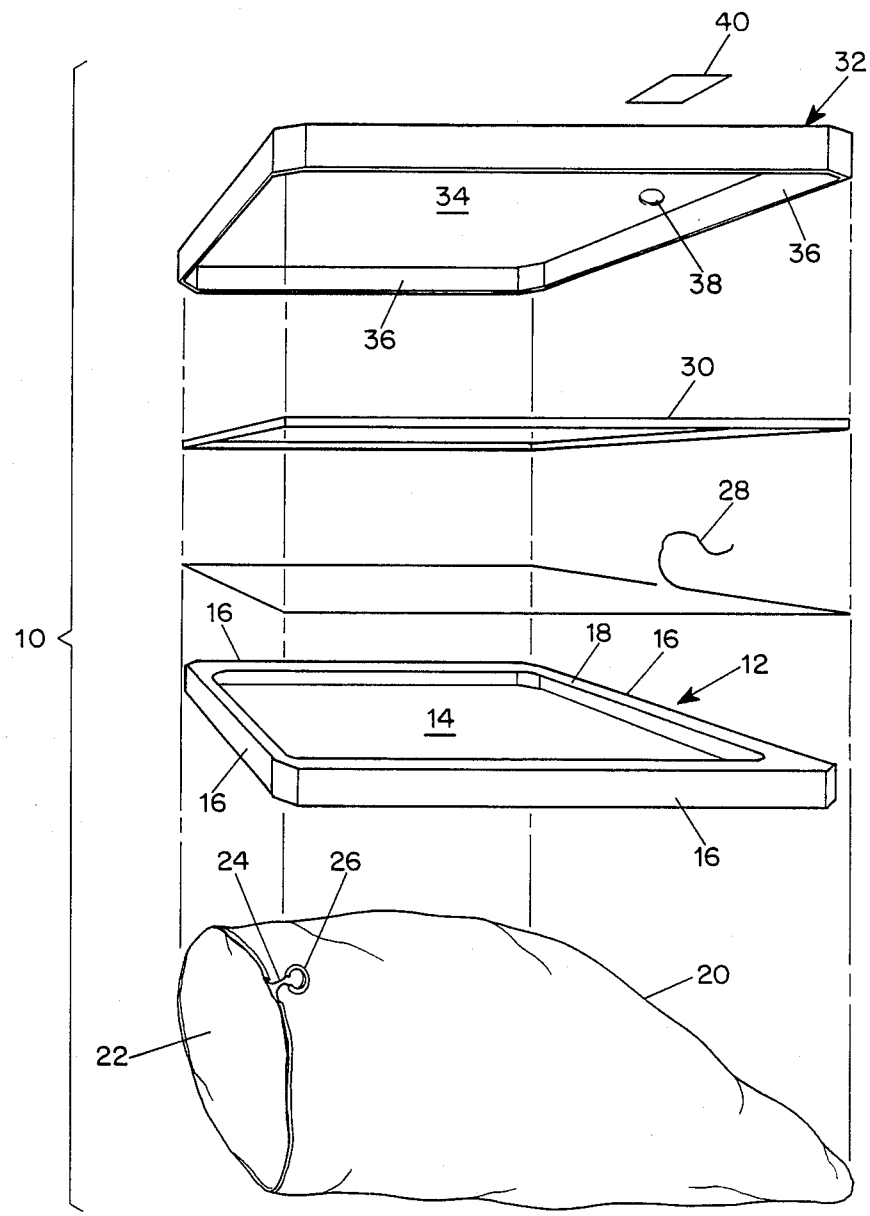
FIG. 1 is an exploded view, in perspective, of one embodiment of a disposable cat litter system in accordance with the invention.

FIG. 1 shows an exploded perspective view the basic elements of a first embodiment of a cat litter system according to the invention.

The cat litter device 10 comprises a liner pan 12 preferably made of cardboard having a bottom 14 and sides 16 in a generally rectangular configuration. As shown in FIG. 1 the liner pan also has a top edge 18 extending inwardly around its periphery. Disposed generally beneath pan 12 is a disposal bag 20 having an opening 22 and a drawstring 24 with a handle 26. The drawstring 24 extends entirely around the opening 22. A tear cord 28 is also provided around the entire periphery of the liner pan 12, as shown in FIG. 1. The purpose of this tear cord will be described below.

Also shown in FIG. 1 is a bag holding band 30, which is positioned around the sides of the liner pan 12 to hold the disposal bag 20 in place. This bag holding band 30 is preferred, but is not needed according to the invention. A cover lid 32 in the form of a paper wrapper is shown having a top portion 34 and downwardly extending side portions 36 which, when the assembly is complete, fall on the outside of sides 16 of the liner pan 12. As shown in FIG. 1, a glue lip is provided between the edges of the top portion 34 of the paper wrapper cover lid 32 and the upper edge 18 of the liner pan 12.

The paper wrapper cover lid 32 defines a filling hole 38 which functions to both allow cat litter to be inserted into the assembly during manufacture, if desired, and also for allowing the end of the tear cord 28 to protrude therefrom to enable grasping thereof by a user to remove the top of the paper wrapper cover lid to expose the cat litter beneath. A filling hole patch 40 is provided for covering the filling hole after the cat litter is inserted therethrough during manufacture. The patch 40 will of course allow the end of the tear cord 28 to be exposed to enable grasping thereof by a user.

Turning now to FIG. 3, the steps for assembling the embodiment shown in FIG. 1 and 2 will now be described. The first step constitutes positioning the tear cord 28 around the upper edge of a liner pan 12 as shown in step 1. A disposal bag 20 is then glued to the exterior of the liner pan 12 at the bottom 14 and around all four sides 16 as seen in step 2. The disposal bag 20 is then folded back so that the opening 22 of the bag and the top opening of the liner pan 12 are aligned as shown in step 3, with the drawstring handle 26 positioned at one side of the liner pan with a substantial portion of the bag bunched up at this one side as shown. The circumferences of the disposal bag opening 22 and the liner pan opening are about the same so that the opening 22 of the bag fits snugly about the opening of the liner pan 12. As shown in step 4, a bag holding band 30 may then be positioned about the sides of the liner pan to hold the disposal bag in place.

In the present state, the assembly comprises one form of the invention wherein cat litter is not provided as part of the litter system. The present assembly could be made and sold, with the user obtaining his own cat litter separately, of this own choosing, and filling the disposable cat litter box by himself. However, in accordance with another form of the invention, cat litter and other elements are combined with the present assembly to provide a complete cat litter packaging system.

Figure 2:
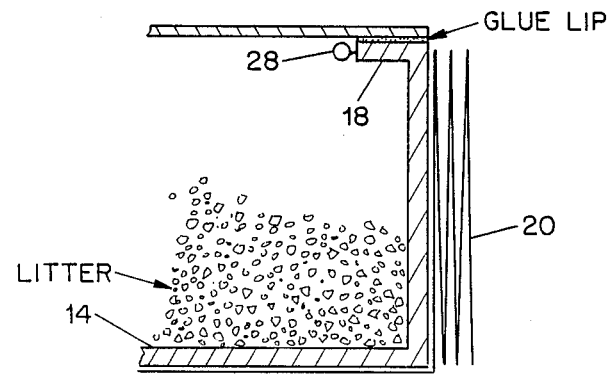
FIG. 2 is an elevational view, in cross section, of a section of the cat litter system shown in FIG. 1.

As shown in step 5 of FIG. 3, the drawstring handle 26 is shown placed inside the liner pan 12 and the liner pan is then wrapped with the cover lid 34 which is preferably made of heavy brown paper or the like, by gluing the cover lid to the inwardly extending top edge 18 of the liner pan 12 (see FIG. 2). While this is being done, care is taken to leave the end of the tear cord 28 accessible by the filling hole 38 in the cover lid. As shown in step 6 of FIG. 3, the assembly would be filled with litter via the filling hole, and the filling hole is then sealed by gluing on a filling hole patch 40.

Figure 4A:
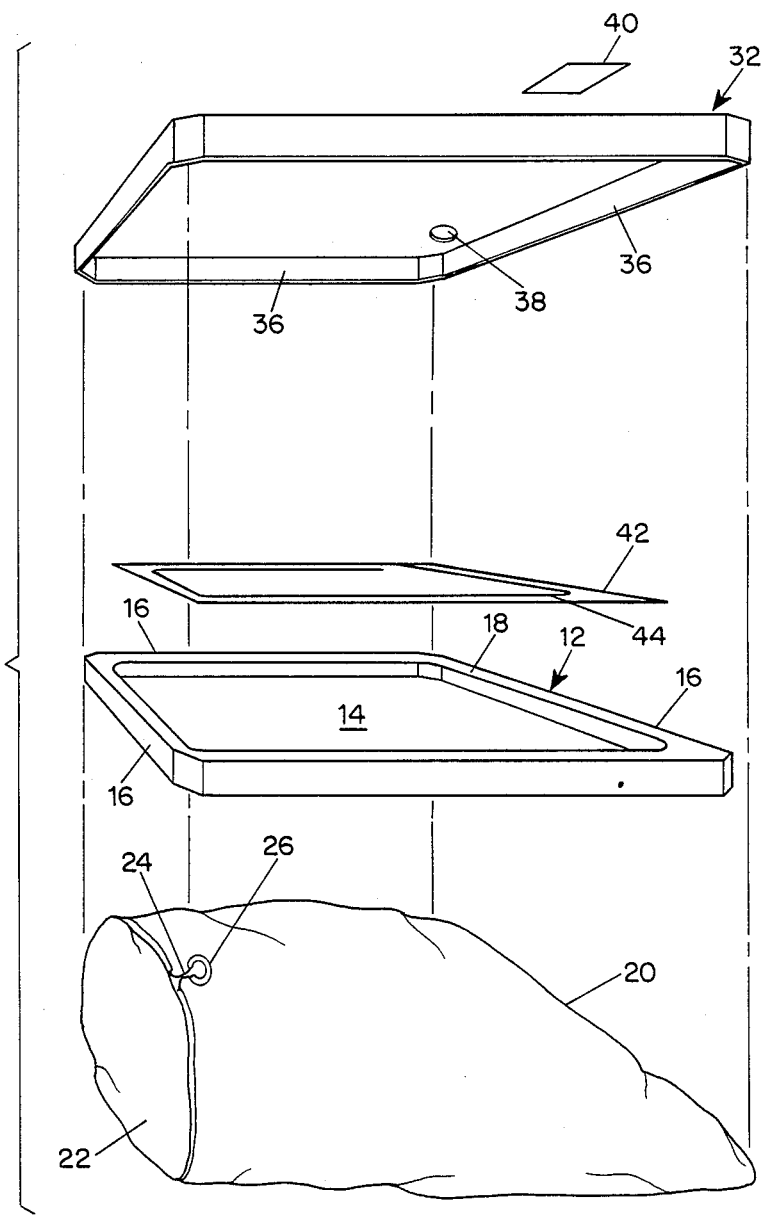
FIG. 4A is an exploded view of a variation of the disposable cat litter system of FIG. 1.
Figure 4B:
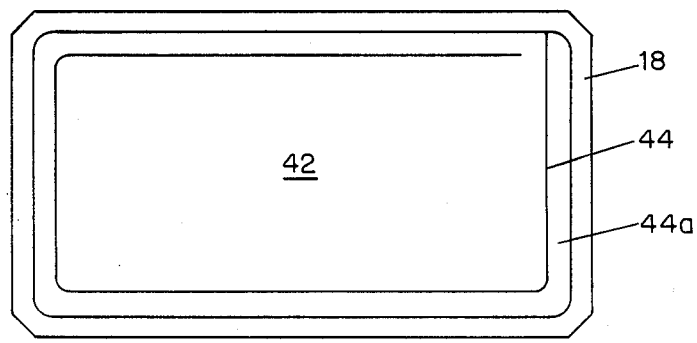
FIG. 4B is a top plan view of the tear cord cover of the embodiment of FIG. 4A.
Figure 4C:
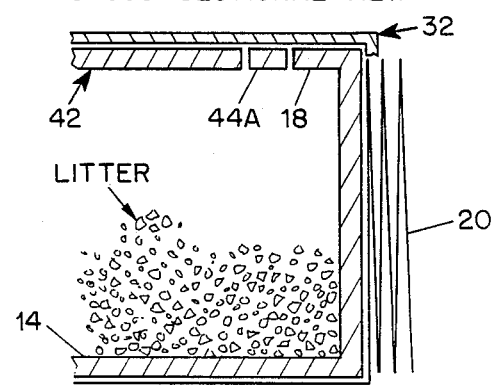
FIG. 4C is an elevational view, in cross section, of a section of the cat litter system shown in FIG. 4A.

A modified version of the disposable cat litter system of the FIG. 1 embodiment is shown in FIGS. 4A–4C. In this modified version, the tear cord is replaced by a cardboard tear cord cover 42 having a cut line 44 which extends about one-inch inwardly of the periphery as shown. In this arrangement, the user obtains access to the cardboard tear cord cover by punching a hole through the filling hole patch 40, and then grasps the corner 44a of the tear cord cover to effect a tearing and removal of the top of the cover lid 34 in the same manner as in the embodiment of FIG. 1. In this embodiment, the liner pan 12 has squared-off corners so that it can accommodate a standard cat litter box cover.

As shown in FIG. 5, an alternative embodiment of the invention comprises a litter bag 50 containing cat litter 52 and having a tear cord 54 for opening the litter bag. Attached to one side of the litter bag 50 is a disposal bag 56. The disposal bag 56 has an opening large enough to fully encircle the bag as shown in steps 2–4 of FIG. 5, and has a drawstring provided around the opening, with a drawstring disposal handle 58 also being provided.

The litter bag can be placed in a cat litter pan 60 of preferably rigid construction having a bottom and upwardly extending sides, with the one bag side of the litter bag downward so that the disposal bag opening is arranged around the edges of the pan. The litter bag may then be opened with the drawstring to expose the cat litter for use by a cat. After use, the drawstring can be used to fully enclose the litter bag and used cat litter for easy disposal thereof.

The litter bag on at least its downward side is preferably made of a material strong enough to withstand clawing by a cat's paws without forming holes therein, so that it serves as a protective layer in addition to being a litter bag for holding the cat litter.

While particular embodiments of a cat litter system have been shown and described, numerous variations and modifications to the preferred embodiments will readily occur to those skilled in the art. The invention is therefor not limited to the preferred embodiments illustrated and described, but is limited only by way of the appended claims and equivalents thereof.

I claim:

1. A disposable cat litter system comprising:
   a litter bag containing cat litter and having at least one generally flat side;
   a disposal bag attached to said litter bag side, said disposal bag having an opening large enough to encircle the litter bag and a drawstring means around said opening,
   whereby said litter bag can be placed in a cat litter pan with the one bag side downward with the disposal bag opening arranged around the edges of the pan and whereby the litter bag may be opened to expose said cat litter for use by a cat and after use the drawstring can be used to fully enclose the litter bag and used cat litter for easy disposal thereof.

2. The disposable cat litter system according to claim 1, wherein the litter bag on at least its downward side is made of a material strong enough to withstand clawing by a cat's paws without forming holes therein.

3. The disposable cat litter system according to claim 1, wherein the litter bag has a tear cord for opening the litter bag and exposing the cat litter for use.

* * * * *